No. 638,947. Patented Dec. 12, 1899.
H. E. WHITE.
STOVEPIPE COLLAR.
(Application filed Dec. 1, 1897.)
(No Model.)
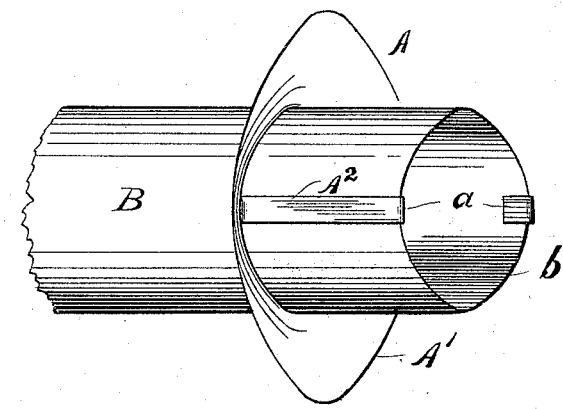
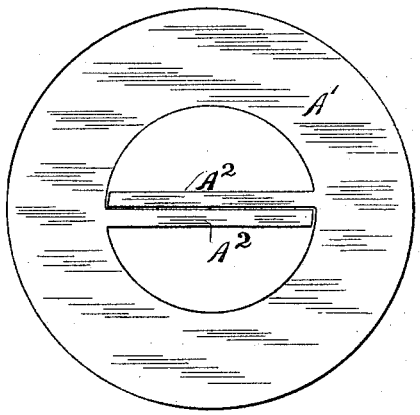
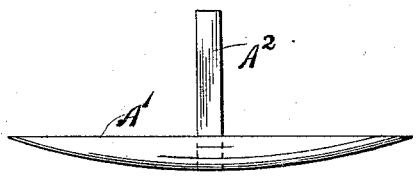
Witnesses:
J. Buehler.
L. Hanke.
Inventor.
Halbert E. White.
by G. S. Noble
Att'y

UNITED STATES PATENT OFFICE.

HALBERT E. WHITE, OF CHICAGO, ILLINOIS.

STOVEPIPE-COLLAR.

SPECIFICATION forming part of Letters Patent No. 638,947, dated December 12, 1899.

Application filed December 1, 1897. Serial No. 660,457. (No model.)

*To all whom it may concern:*

Be it known that I, HALBERT E. WHITE, a citizen of the United States, residing at Chicago, in the county of Cook and State of Illinois, have invented certain new and useful Improvements in Stovepipe-Collars, of which the following is a specification.

My invention has for its primary object to so connect the collar with the pipe that said collar may serve as a positive stop to prevent the pipe from being pushed too far into the chimney or stack.

A further object is to provide means whereby said collar may be adjustably attached to the pipe to determine the distance to which it enters the chimney or stack; and said invention consists in providing the collar with bendable or pliable arms, so that hooks may be formed in them at varying distances from the body of the collar to adjust the latter toward or from the end of the pipe, and in the various combinations and details hereinafter described.

In the drawings, Figure 1 is a perspective view showing a construction embodying my invention, the collar being in place on a stovepipe. Fig. 2 is a view of the blank from which the collar is formed. Fig. 3 is a view of the collar complete.

Similar letters refer to similar parts throughout the several views.

A represents the collar complete, consisting of the annulus or disk A', having the upturned arms A², which may be bent to form suitable hooks *a* to engage with the end *b* of the stovepipe B either before or after applying to the pipe. The collar is manufactured by blanking out of sheet metal suitable-sized disks, as shown in Fig. 2, leaving the two parallel arms A² lying across the central aperture and severed from the body at one end only, the arms springing from opposite sides of the aperture and the severed end of one arm being adjacent to the base of the other arm. The arms may then be bent up, as shown in Fig. 3, and hooks formed in their free ends, and the collar is ready to be applied to the stovepipe.

In order that the collar may be adjustable upon the pipe, the arms will be left untempered, so as to be pliable, and after setting the collar at any desired distance from the end of the pipe said arms will be bent over to embrace and hook upon the ends.

As thus constructed it is evident that while the collar is readily detachable from the pipe whenever the latter is taken down it is yet held fixed against any inward thrust of the pipe while in position, and thus forms a stop to determine the distance to which the pipe enters the chimney. It is also evident that great economy is attained in packing and shipment, since the device can be put upon the market as a complete article of merchandise in its blank form, the purchaser bending the arms to fit the pipe to which the collar is to be applied.

I claim—

1. A stovepipe-collar consisting of a concavo-convex disk of soft or bendable metal, having formed therein a central opening for a stovepipe, and having extending across said opening, arms formed integrally with said disk and adapted to be bent up at right angles thereto, and to have their ends bent over to embrace the edge of the stovepipe, substantially in the manner and for the purpose set forth.

2. A blank for stovepipe-collars consisting of an annulus of suitable sheet metal provided with an integral slitted strip extending across the aperture of the annulus, the two parts of the strip thus formed being severed from the blank so as to enable them to be bent up to form diametrically-opposed arms.

In testimony whereof I affix my signature in presence of two witnesses.

HALBERT E. WHITE.

Witnesses:
B. SINGER,
HARVEY A. WHITE.